United States Patent [19]

Kelly

[11] Patent Number: 5,327,695
[45] Date of Patent: Jul. 12, 1994

[54] TAB AND SLOT CONNECTOR MEANS

[75] Inventor: Michael H. Kelly, Epping, Australia

[73] Assignee: John Lysaght (Australia) Limited, Sydney, Australia

[21] Appl. No.: 730,779

[22] PCT Filed: Nov. 29, 1990

[86] PCT No.: PCT/AU90/00571

§ 371 Date: Jul. 29, 1991

§ 102(e) Date: Jul. 29, 1991

[87] PCT Pub. No.: WO91/08357

PCT Pub. Date: Jun. 13, 1991

[30] Foreign Application Priority Data

Nov. 30, 1989 [AU] Australia ............... PJ7636

[51] Int. Cl.$^5$ ................. E04C 3/30
[52] U.S. Cl. ................. 52/735; 52/696; 52/667; 403/230
[58] Field of Search ........... 52/735, 327, 667, 696; 403/230; 411/457, 459

[56] References Cited

U.S. PATENT DOCUMENTS

| | | | |
|---|---|---|---|
| 2,386,887 | 10/1945 | Eckel | 411/457 |
| 3,102,610 | 9/1963 | Shelby, Jr. | 52/327 X |
| 3,286,416 | 11/1966 | Ashworth | 52/735 |
| 3,802,147 | 4/1974 | O'Konski | 52/735 |
| 4,209,265 | 6/1980 | Moehlenpah | 403/230 |

Primary Examiner—David A. Scherbel
Assistant Examiner—Beth A. Aubrey
Attorney, Agent, or Firm—Nikaido, Marmelstein, Murray & Oram

[57] ABSTRACT

A first structural frame member (11) has two tabs (15) projecting from one end and may be secured to a second structural frame member (21) having two slots (25) piercing it intermediate its ends by insertion of the tabs through the respective slots N'Z and subsequent deformation of the tabs to prevent their withdrawal from the slots. Each tab tapers from a tab base (15A) to a tab tip (15B) which is narrower than the tab base, and each slot is defined by two opposed, short, end faces (26) and two opposed, elongate 'Z side faces, said side faces comprising opposed center parts (27), each at least as long as the width of the tab tip, and opposed flanking parts (28) on either side of the center parts extending from the center parts to the respective end faces. The spacing between said center parts is greater than the lengths of the end faces, whereby, in use, the tab tips can be inserted freely into the slots notwithstanding some misalignment therebetween and, on continued insertion, the tabs are guided by flanking parts into alignment with the opposed end faces for snug accommodation of the tab base therebetween.

10 Claims, 2 Drawing Sheets

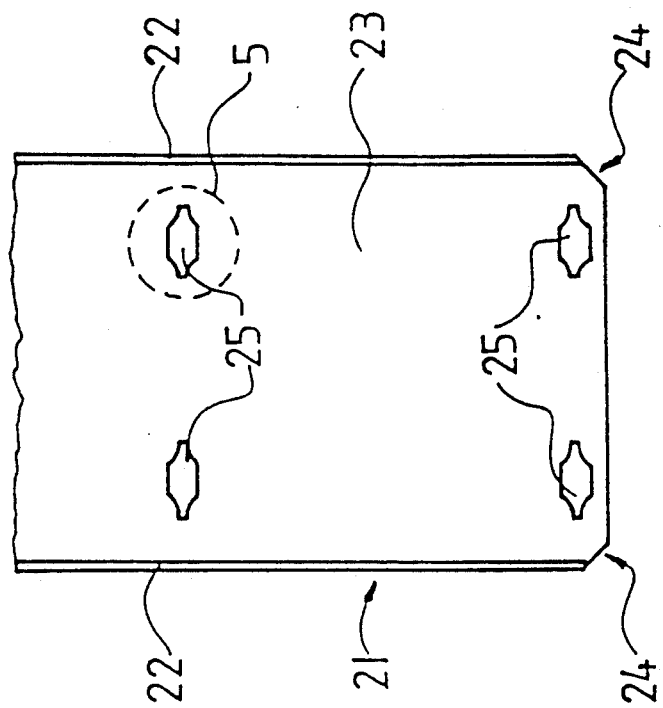
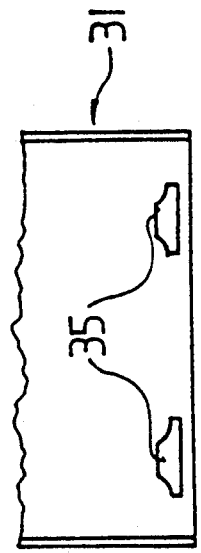
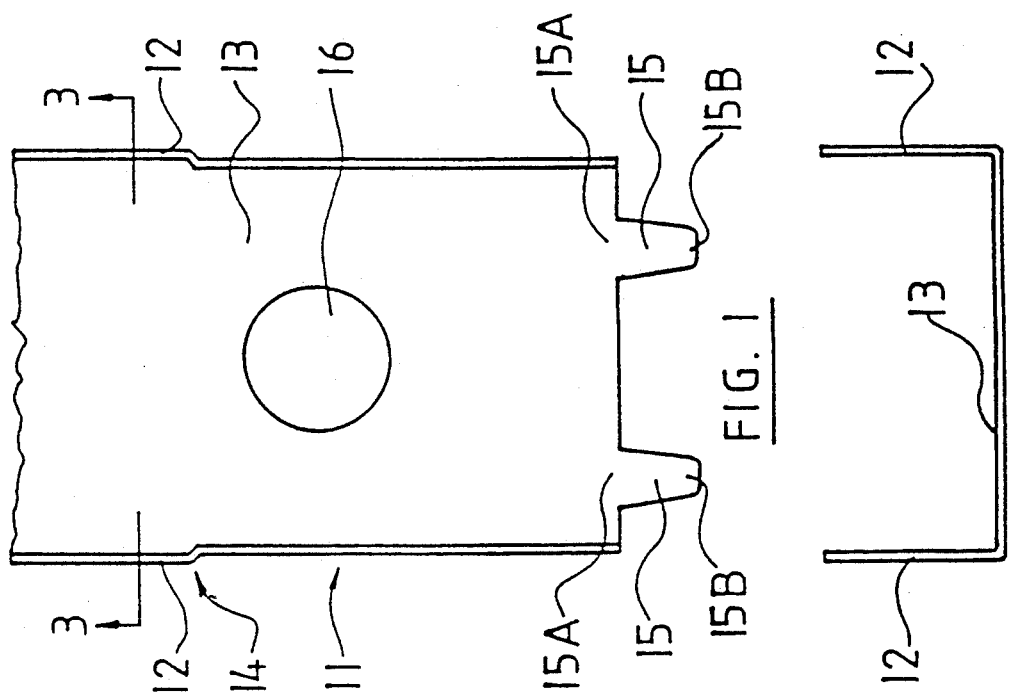
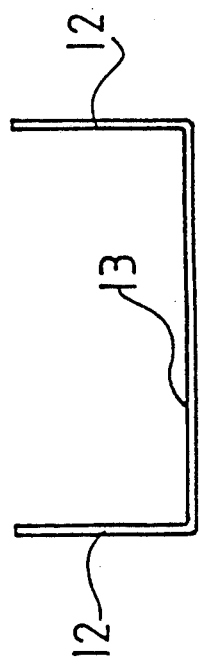

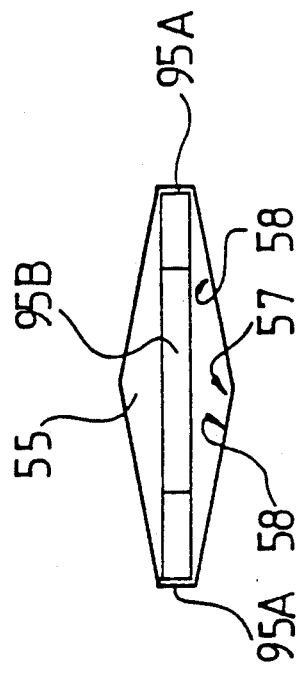
FIG. 8
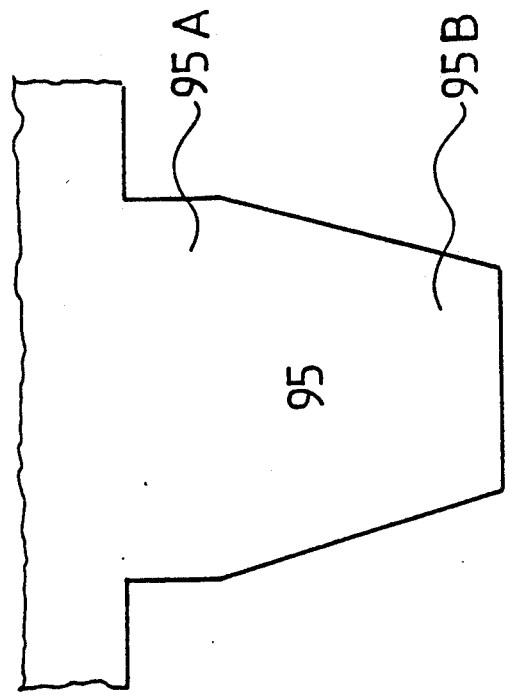
FIG. 9
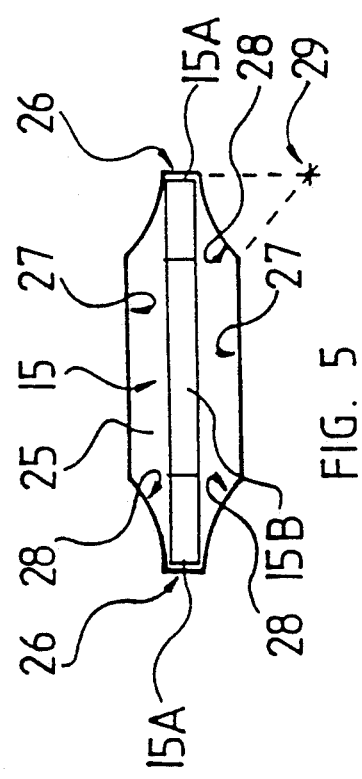
FIG. 5
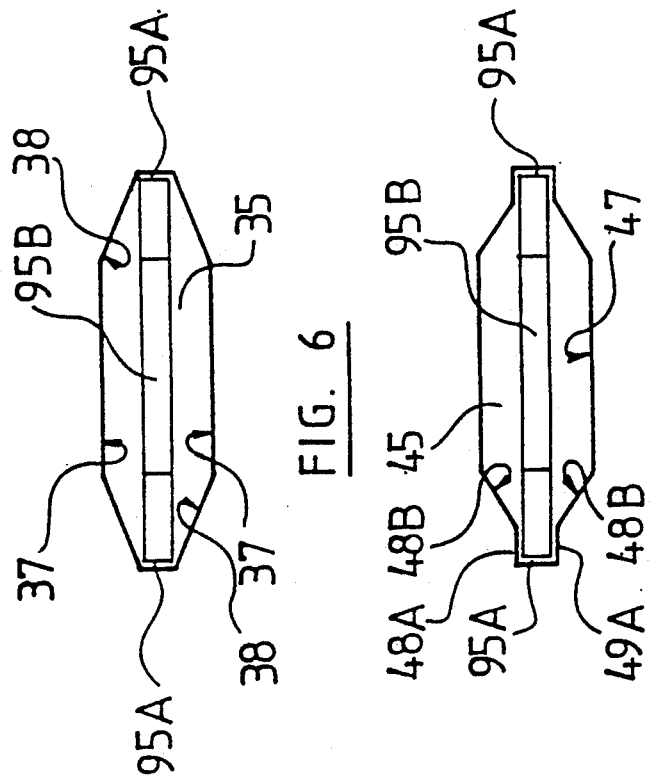
FIG. 6
FIG. 7

TAB AND SLOT CONNECTOR MEANS

TECHNICAL FIELD

This invention relates to connector means, and more particularly, to tab and slot connector means by which a connection is made between two elements by inserting a tab formed on one element through a slot in the other, and thereafter deforming, for example bending over or twisting, that part of the fully inserted tab projecting beyond the other element to prevent the tab from withdrawing from the slot.

Tab and slot connector means of the above-indicated kind have a variety of applications, including the interconnection of small pressed metal components of various goods, for example toys, and the interconnection of much larger scale metal structural members such as those used as frame members in steel building frames. The invention has arisen from the development of steel building frame members, but it will be appreciated from the ensuing description that it may be applied to tab and slot connector means in other fields as well.

BACKGROUND ART

Steel framing systems for buildings may be assembled from structural members which are roll formed from steel strip and provided with tabs and slots so that they can be readily interfitted to form a strong frame.

The structural members may be factory produced on machinery which forms, punches and crops them to order for immediate supply and assembly into individually designed frames with virtually no wastage and with no need for stockpiling.

Machinery for production of such framing elements is disclosed in Australian Patent No. 570845 and pending Australian patent application no. 56949/90. A typical steel framing system using such elements is described in Australian Patent No. 484003. As disclosed therein, the frame is assembled by connecting structural members formed with projecting end tabs to further structural members formed with slots, by inserting the tabs through the slots of the further members and then folding the tabs laterally to prevent withdrawal.

Typically, the frame members may be produced as elongate channel-shaped members. These may have a pair of tabs projecting from each end and pairs of transverse slots punched in their connecting webs at regular intervals along their length, so that the tabs of one member can be passed through a pair of the transverse slots of a further adjoining member, at any one of a number of locations along the length of the further adjoining member. However, some of the frame members may have slots but no end tabs, and others may be formed with end tabs but no slots, for interconnection with the slotted members.

DISCLOSURE OF INVENTION

While the manufacture of steel building frame members can be carried out very rapidly by computer controlled machinery, the actual assembly of frames must be done by hand. This is a relatively slow laborious operation, requiring maneuvering of quite heavy elements into accurate positions to align the tabs for insertion through the slots, and then bending of the tabs to secure the members together.

The present invention provides an improved tab and slot arrangement which greatly facilitates the insertion of the tabs through the slots and in particular reduces the problem of tab alignment on initial insertion.

According to the invention there is provided tab and slot connector means of the kind comprising a tab projecting from a first element and a slot piercing a second element to be connected to said first element by insertion of the tab through the slot and subsequent deformation of the tab to prevent its withdrawal from the slot, characterised in that:

(a) the tab tapers from a tab base to a tab tip which is narrower than the tab base, and in that (b) the slot is defined by two opposed, short, end faces and two opposed, elongate side faces, said side faces comprising opposed centre parts, each at least as long as the width of the tab tip, and opposed flanking parts on either side of the centre parts extending from the centre parts to the respective end faces, and in that the spacing between said centre parts is greater than the lengths of the end faces, whereby, in use, the tab tip can be inserted freely between said centre parts and, on its continued insertion, the tab is guided by said flanking parts into alignment with the opposed end faces for snug accommodation of the tab base therebetween.

The invention also consists in an elongate structural member of the kind comprising a tab projecting from an end of the member and a slot piercing the member between its ends, such that, in use, the member can be connected to a similar member by inserting the tab through the slot of the similar member and deforming the tab to prevent its withdrawal from the slot, characterised in that the tab and slot are respectively in accordance with the tab and slot of connector means according to the invention as described above.

The invention also extends to a pair of elongate structural members provided with connector means according to the invention, wherein the tab of the connector means projects from one of the pair of members and the slot of the connector means is formed in the other of the pair of members.

The spacing between the slot side faces may reduce continuously from a midpoint of the slot to its two ends, so that the central part of the slot is of variable width. Preferably however, the central part of the slot is of a substantially uniform width, that is to say the opposed centre parts of its side faces are substantially parallel.

Said flanking parts of the side faces may be straight, with each extending from an end of the centre part of its side face to a corresponding end of the adjoining end face, or the mutually opposed flanking parts may comprise converging intermediate segments extending from the centre parts of the side faces to substantially parallel end segments extending from the intermediate segments to the end faces of the slot. Those intermediate segments may be straight or convexly curved. In either instance the end segments are, of course, spaced apart by a distance equal to the length of the end faces, and snugly receive margins of the tab base between them on full insertion of the tab.

Preferably, however, each said flanking part is wholly convexly curved and meets its adjoining centre part at an obtuse included angle and the adjoining end face at an angle of substantially 90°, so that the side faces of the tab base are substantially tangential to said flanking parts at or adjacent the slot ends, when the tab is fully inserted into the slot.

Usually the respective side faces are mirror images, but in some embodiments, only one side face of the slot may be shaped in one or other of the ways described above, and the other, opposed, side face may be straight.

BRIEF DESCRIPTION OF THE DRAWINGS

In order that the invention may be more fully explained, some exemplary embodiments are described in some detail hereinafter with reference to the accompanying drawings, in which:

FIG. 1 is a plan view of an end part of an elongate steel building frame member formed with a pair of longitudinally projecting end tabs, being tabs of the kind characteristic of connector means according to the invention;

FIG. 2 is a view similar to FIG. 1 of an end part of a second steel building frame member formed with pairs of transverse slots at regular intervals along its length, being slots of the kind characteristic of connector means according to the invention;

FIG. 3 is a view similar to FIG. 2 of another structural member incorporating the invention;

FIG. 4 is a sectional view taken on line 3—3 of FIG. 1;

FIG. 5 is an enlarged view of the slot appearing within the enclosure 5 in FIG. 2 with a tab of the kind referenced 15 in FIG. 1 fully inserted therethrough prior to the tab's deformation;

FIGS. 6, 7 and 8 are views similar to FIG. 5 of other embodiments of the invention; and FIG. 9 is a side elevation of an alternative tab, being the tab appearing in FIGS. 6, 7 and 8 drawn to the same scale as those figures.

BEST MODE OF CARRYING OUT THE INVENTION

FIG. 1 illustrates an end part of a typical steel framing member 11 which is formed to a channel shape having side flanges 12 and a connecting web 13. Member 11 is swaged at 14 to reduce its width, so that its end portion can fit between the flanges of a similar channel-shaped structural member arranged perpendicularly to it, and its end is cropped to form two longitudinally projecting end tabs 15.

Each end tab 15 tapers from a tab base 15A to a tab tip 15B which is narrower than the tab base 15A.

A circular hole 16 may be formed in the connecting web 13 of member 11. Similar holes may be provided at other locations along the length of the member for the purpose of running wiring, plumbing or other service components through the completed frame.

FIG. 2 illustrates a frame member 21 which has an identical cross-section to that of the unswaged part of member 11. It comprises side flanges 22 and a connecting web 23. In contrast to member 11, the frame member 21 is not swaged or formed with tongues at its ends, but is simply cut with generally square ends, although the end corners 24 are preferably mitre cut so as to avoid projecting sharp edges in the completed frame.

In a completed frame, members of the form illustrated in FIG. 2 may be used as top and bottom horizontal plates, and members of the form illustrated in FIG. 1 may be used as upright studs interconnecting those plates. To enable the interconnections to be made, the prospective plate member has pairs of transverse slots 25 formed in its connecting web 23 at regular intervals along its length, so that the tabs 15 of the prospective stud member may be inserted through any selected pair of the slots 25 and then folded laterally against the web of the plate member to prevent withdrawal of the tabs and to provide a firm interconnection between the stud and the plate. The swaged ends 14 of each stud member allow those ends to be fitted snugly between the flanges 22 of the plate member when a connection is to be made.

In accordance with the present invention, the slots 25 are cut to a shape which, in conjunction with the tapered tabs 15, greatly facilitates insertion of the tabs into the slots without sacrificing the firmness or strength of the resulting connection. As most clearly seen in FIG. 5, each slot 15 is of elongate shape, being defined by side faces extending between end faces 26, such that when a tab 15 is fully inserted through it, the tab base 15A is snugly accommodated between the two end faces 26. The slot side faces are mirror images and each comprises a straight centre part 27 and two convex curved flanking parts 28, thus the lateral width of each slot 25 varies along its length such that it is wider between the opposed centre parts 27 of its side faces than it is at its ends. Each centre part 27 is slightly longer than the width of the tab tip 15B, so that, on initial insertion of a tab, the tab tip 15B can be readily inserted into the central part of the slot 15 without particularly accurate alignment of the tab with the slot, because of the substantial clearance between the tab tip and the edges of the slot.

After initial insertion of a tab tip within the central part of the slot, continued insertion of the tab causes the tapered sides of the tab to engage with the converging flanking parts 28 of the slot's side faces, to guide the tab into alignment with the slot, so that, on full insertion, the tab base 15A is brought into snug accommodation between the end faces 26 of the slot, as illustrated in FIG. 5.

In the slot form illustrated in FIGS. 2 and 5, the convexly curved flanking parts 28 of the slot's side faces are arcuate, with their centres of curvature aligned with the adjacent end faces 26, so that each flanking part 28 meets its adjoining end face 26 at 90°, and is therefore substantially tangential to the side faces of the inserted tab 15. This is best seen in FIG. 5, in which the centre of curvature of one of the side face flanking parts 28 is indicated at 29. This slot formation provides for smooth guidance of the tab to the fully inserted position, wherein it is aligned with, and snugly accommodated between, the end faces of the slot.

FIGS. 6, 7 and 8 illustrate alternative slot formations each designed to cooperate with a tab having a tip of lesser width than its base. The drawings show the slots in association with the tab 95 of FIG. 9, comprising a tab base 95A and a tab tip 95B, but they may equally well accept tabs such as tab 15.

The opposed side faces of slot 35 illustrated in FIG. 6 comprise straight, parallel, centre parts 37 and straight, converging flanking parts 38 instead of the convex flanking parts of slot 25.

The slot form 45 illustrated in FIG. 7 also has a central part of uniform width defined by straight, parallel centre parts 47 of its side faces. However, in this instance, the opposed flanking parts of the side faces each comprise two segments, namely mutually parallel end segments 48A, between which the tab base 95A is a snug fit, and converging intermediate segments 48B serving to guide the tab into place as it is being inserted.

FIG. 8 illustrates an alternative slot form 55 in which the lateral width of the slot reduces continuously from its midpoint 57 to each of its ends. In this instance, the centre part 57 of each side face comprises two segments and there is no discontinuity between each segment and its adjoining flanking part 58.

FIG. 3 illustrates an alternative form of frame member 31, which has a straight end cut without mitre cut corners and modified slots 35 which differ from the slots 25 in that one of the slot side faces is straight, extending directly from one end face to the other. That straight side face may be spaced from the end of the member 31 by a distance substantially the same as the thickness of the material from which a mating member is made. This enables a corner joint between two members to be made, wherein there is very little protrusion of the slotted member beyond the web of the tabbed member.

It will be appreciated that details of the slot formation can vary considerably within the broad requirements of the present invention to achieve ready engagement of the tab tip with the central part of the slot and subsequent guidance of the tab into alignment for snug engagement with the ends of the slot on full insertion. The specific form of the tab can also be varied within these broad requirements. Moreover, the invention is not limited in application to structural frame members, and it may be applied in other fields where tab and slot connections are used. It is accordingly to be understood that the invention is not limited to the specific constructions which have been illustrated and described herein, and that the invention extends to every embodiment within the scope of the appended claims.

I claim:

1. Tab and slot connector means of the kind comprising a tab (15) projecting from a first element (11) and a slot (25) piercing a second element (21) to be connected to said first element by insertion of the tab through the slot and subsequent deformation of the tab to prevent its withdrawal from the slot, characterised in that:
   (a) the tab tapers from a tab base (15A) to a tab tip (15B) which is narrower than the tab base, and in that
   (b) the slot is defined by two opposed, short, end faces (26) and two opposed, elongate side faces, said side faces comprising opposed centre parts (27), each at least as long as the width of the tab tip, and opposed flanking parts (28) on either side of the centre parts extending from the centre parts to the respective end faces, and in that the spacing between said centre parts is greater than the lengths of the end faces, whereby, in use, the tab tip can be inserted freely between said centre parts and, on its continued insertion, the tab is guided by said flanking parts into alignment with the opposed end faces for snug accommodation of the tab base therebetween.

2. Connector means according to claim 1 wherein each said flanking part (28) of at least one of said side faces is convexly curved.

3. Connector means according to claim 1 wherein each said flanking part of at least one of said side faces comprises two segments, being a straight end segment (48A) extending from an end of the adjacent end face and an intermediate segment (48B) extending from said end segment to the centre part (47) of said one side face.

4. Connector means according to claim 3 wherein said intermediate segments (48B) are straight.

5. Connector means according to claim 3 wherein said intermediate segments are convexly curved and each is tangential to its adjoining end segment.

6. Connector means according to claim 1 wherein the said side faces are mirror images of each other.

7. Connector means according to claim 1 wherein one of said side faces is straight.

8. Connector means according to claim 1 wherein each said side face meets its adjoining end faces at angles of substantially 90°.

9. A structural member comprising a tab projecting from an end of the member and a slot piercing the member between its ends, wherein the member is connectable to a similar member by inserting the tab through the slot of the similar member and deforming the tab to prevent its withdrawal from the slot, whereby the tab and slot are respectively in accordance with the tab (15) and slot (25) of connector means according to claim 1.

10. A pair of elongate structural members (11,21) provided with connector means according to claim 1, wherein the tab (15) of the connector means projects from one of the pair of members and the slot (25) of the connector means is formed in the other of the pair of members.

* * * * *